US009959770B2

(12) United States Patent
Kleywegt

(10) Patent No.: US 9,959,770 B2
(45) Date of Patent: May 1, 2018

(54) AIRCRAFT FLIGHT ITINERARY ALERTING SYSTEM

(71) Applicant: AIRSUITE Inc., Thunder Bay (CA)

(72) Inventor: Michael Kleywegt, Thunder Bay (CA)

(73) Assignee: AIRSUITE Inc., Thunder Bay, CA (US)

( * ) Notice: Subject to any disclaimer, the term of this patent is extended or adjusted under 35 U.S.C. 154(b) by 0 days. days.

(21) Appl. No.: 15/350,789

(22) Filed: Nov. 14, 2016

(65) Prior Publication Data

US 2017/0236426 A1    Aug. 17, 2017

Related U.S. Application Data

(60) Provisional application No. 62/255,045, filed on Nov. 13, 2015.

(51) Int. Cl.
G08G 1/123    (2006.01)
G08G 5/00    (2006.01)

(52) U.S. Cl.
CPC ............................... G08G 5/0017 (2013.01)

(58) Field of Classification Search
CPC ......... G08G 5/0017; G08G 5/00; H04W 4/12; H04W 4/14
USPC ........................................................ 340/994
See application file for complete search history.

(56) References Cited

U.S. PATENT DOCUMENTS

| 5,351,194 | A | 9/1994 | Ross et al. | |
|---|---|---|---|---|
| 7,076,235 | B2 * | 7/2006 | Esque | H04M 3/42 455/404.1 |
| 7,312,712 | B1 * | 12/2007 | Worrall | G06Q 10/06 340/309.16 |
| 2004/0198315 | A1 | 10/2004 | Vellotti | |
| 2004/0220841 | A1 | 11/2004 | Fairweather | |
| 2014/0282038 | A1 * | 9/2014 | Royster | G01C 21/206 715/738 |

* cited by examiner

*Primary Examiner* — Eric M Blount
(74) *Attorney, Agent, or Firm* — Ryan W. Dupuis; Ade + Company Inc.; Kyle R. Satterthwaite

(57) ABSTRACT

A flight itinerary alerting system for monitoring a flight itinerary includes a monitoring system storing flight itinerary data like pilot contact data, first tier contact data, and second tier contact data. An alert routine executable on the monitoring system i) determines first or second tier alert conditions if no deactivation message is received upon expiry of a respective first or second duration following the expected arrival time, and ii) send an alert message through a communication network to a computer device of a corresponding first or second tier contact person upon determination of the respective alert condition. The multiple tiers of contact data with respective alerting criteria allows quick determination if search and rescue should be contacted with inherent redundancy, thus preventing overdue aircraft from being overlooked, while also minimizing false alarms in reporting overdue aircraft to search and rescue which might reasonably be accounted for by responsible persons.

13 Claims, 5 Drawing Sheets

AIRCRAFT FLIGHT ITINERARY ALERTING SYSTEM

This application claims the benefit under 35 U.S.C. 119(e) of U.S. provisional application Ser. No. 62/255,045, filed Nov. 13, 2015.

FIELD OF THE INVENTION

The present invention relates to an alerting system for monitoring an aircraft flight and for sending alert messages according to prescribed criteria in the event that an aircraft flight exceeds the expected arrival time prescribed by its flight itinerary.

BACKGROUND

Rules relating to operation of aircraft require that operators of the aircraft generate an operational flight plan which includes itinerary information along with various additional data which may include aircraft identification, GPS tracking information, pilot identification, a passenger manifest, a listing of dangerous goods, a route plan, a fuel plan, etc. Where possible, aircraft are tracked on radar such that position, air speed and altitude are updated to air traffic controllers. Where no radar tracking is available, air traffic controllers rely on reporting by the pilot. All flight plans must be closed so that persons monitoring the aircraft know that the aircraft has landed safely. This may be accomplished automatically at controlled airports actively monitored by tracking systems and air traffic controllers; however, at uncontrolled airports the pilot is relied upon to close a flight plan. An open flight plan which is overdue beyond the expected arrival time may be an indication that the aircraft encountered a problem and requires assistance; however, the flight plan may simply remain open because the pilot has not yet had an opportunity or has forgotten to close the flight plan. Even when a flight plan remains open beyond an expected arrival time, any emergency response action is dependent upon monitoring personnel noticing that an aircraft flight is overdue. An improved method of communicating between the pilot, monitoring personnel, and emergency response personnel is therefore desired to minimize overlooked aircraft which may require assistance and to minimize false alarms resulting from pilots who have returned but have inadvertently not yet closed their flight plan.

U.S. Pat. No. 5,351,194 by Ross et al discloses an apparatus and method for closing flight plans and locating aircraft which relies on a controller supported on the aircraft which must communicate with an air traffic control to identify location of the aircraft. The system operates automatically to identify emergency situations to initiate search and rescue operations, but is very limited in its ability to communicate with the pilot or other authorized personnel to better assess if the initiation of search and rescue operations is warranted.

US 2004/0220841 by Fairweather discloses an alerting system for travellers which receives travel itinerary from a subscriber and sends an alert to a designated contact person if the traveller has not cancelled the alert upon reaching an estimated arrival time. The system is limited to monitoring of a single trip and alerting a single contact person such that the alerting system is not readily adaptable to an aircraft flight environment in which a much greater degree of reporting must be followed and a greater degree of coordination between multiple parties may be required.

US 2004/0198315 by Velloti discloses a travel plan emergency altering system to send an alert message to a designated contact person if the user has not reporting their arrival to the system before an expected arrival time. This system is also limited to a single reporting criteria such that the alerting system is not readily adaptable to an aircraft flight environment in which a much greater degree of reporting must be followed and a greater degree of coordination between multiple parties may be required.

SUMMARY OF THE INVENTION

According to one aspect of the invention there is provided a flight itinerary alerting system for monitoring a flight itinerary associated with an aircraft flight, the system comprising:

a central monitoring system comprising a computer server adapted to receive and store flight itinerary data which includes: i) an expected arrival time of the aircraft flight, ii) pilot contact data associated with a primary contact person corresponding to a pilot of the aircraft flight, iii) first tier contact data associated with at least one first tier contact person, and iv) second tier contact data associated with at least one second tier contact person;

at least one user computer device associated each of the contact persons respectively;

a communication interface enabling the central monitoring system to communicate with said plurality of user computer devices over a communications network so as to be adapted to: i) communicate a deactivation message from any one of the user computer devices to the central monitoring system, and ii) communicate alert messages from the central monitoring system to designated ones of the plurality of user computer devices as determined by the central monitoring system;

an alert processing routine executable on said central monitoring system so as to be adapted to:
  i) determine a first tier alert condition if no deactivation message has been received by the central monitoring system from the primary contact person upon expiry of a first duration following the expected arrival time and send an alert message to said at least one user computer device of said at least one first tier contact person using the first tier contact data upon determination of the first tier alert condition; and
  ii) determine a second tier alert condition if no deactivation message has been received by the central monitoring system from the primary contact person or said at least one first tier contact person upon expiry of a second duration following the expected arrival time and send an alert message to said at least one user computer device of said at least one first tier contact person and said at least one second tier contact person using the first and second tier contact data upon determination of the second tier alert condition.

The use of multiple tiers of contact data with respective alerting criteria allows several different levels of alert condition reporting to occur to quickly determine if search and rescue should be contacted with inherent redundancy, thus preventing overdue aircraft from being overlooked, while also minimizing false alarms in reporting overdue aircraft to search and rescue which might reasonably be accounted for by responsible persons.

Preferably the communication interface includes a short message service interface adapted to receive the deactivation message in the form of a short message service message.

When said at least one user computer device associated with the primary contact person comprises a mobile phone, preferably the system further comprises a validation routine executable on said central monitoring system so as to be adapted to only accept the deactivation message from the mobile phone of the primary contact person subsequent to an exchange of validation information with the mobile phone. When the communication interface includes a short message service interface, the system may be adapted to receive the validation information in the form of a short message service message.

Preferably the central monitoring system is adapted to receive an extension message through the communication interface from said at least one user computer device of the primary contact person, and wherein the alert processing routine is adapted to extend the expected arrival time of the aircraft flight upon receipt of the extension message by the central monitoring system.

Preferably the communication interface includes at least two interfaces selected from the list consisting of a short message service interface, a telephone exchange interface, and an email server interface, and wherein each alert message comprises a first message transmitted through a first one of the communication interfaces and a second message transmitted through a second one of the communication interfaces after a prescribed duration following the first message.

Preferably each deactivation message includes identity information which identifies the contact person from which the deactivation message originated. In this instance, the alert processing routine may be adapted to send an identification message, that includes the identity information, to the contact data of each contact person that previously received the alert message upon receipt of the deactivation message.

The flight itinerary data stored on the central monitoring system may further include third tier contact data associated with at least one third tier contact person. In this instance the alert processing routine may be adapted to determine a third tier alert condition if no deactivation code has been received by the central monitoring system from the primary contact person, said at least one first tier contact person, or said at least one second tier contact person upon expiry of a third duration following the expected arrival time and send an alert message to said at least one user computer device of each contact person upon determination of the third tier alert condition.

The alert processing routine may be adapted to send a warning message to the contact data of the primary contact person before expiry of said first duration in which the warning message comprises a first message transmitted through a first one of the communication interfaces and a second message transmitted through a second one of the communication interfaces after a prescribed duration following the first message, but before the expiry of said first duration.

Preferably the alert processing routine is adapted to contact an operator of the central monitoring system if no deactivation message is received from any of the contact persons upon expiry of a final duration following the expected arrival time.

The system may further be associated with an aircraft monitoring system adapted to track a location of a plurality of aircraft. In this instance, the alert processing routine may be adapted to determine if an aircraft is in use based on the location being tracked, and send an alert message to at least the first tier contact data in response to determination of an aircraft being in use having no active flight itinerary data stored on the central monitoring system.

According to a second aspect of the present invention there is provided a flight itinerary alerting system for monitoring a flight itinerary associated with an aircraft flight, the system comprising:

a central monitoring system comprising a computer server adapted to receive and store flight itinerary data which includes: i) an expected arrival time of the aircraft flight, ii) pilot contact data associated with a primary contact person corresponding to a pilot of the aircraft flight, and iii) other contact data associated with a plurality of other contact persons;

at least one user computer device associated each of the contact persons respectively;

a communication interface enabling the central monitoring system to communicate with said plurality of user computer devices over a communications network so as to be adapted to: i) communicate a deactivation message from any one of the user computer devices to the central monitoring system, and ii) communicate alert messages from the central monitoring system to designated ones of the plurality of user computer devices as determined by the central monitoring system, wherein each deactivation message includes identity information which identifies the contact person from which the deactivation message originated;

an alert processing routine executable on said central monitoring system so as to be adapted to:
  i) determine a first tier alert condition if no deactivation message has been received by the central monitoring system from the primary contact person upon expiry of a first duration following the expected arrival time and send an alert message to said at least one user computer device of said at least one first tier contact person using the first tier contact data upon determination of the first tier alert condition; and
  ii) send an identification message, that includes said identity information, to the contact data of each contact person that previously received the alert message upon receipt of the deactivation message.

The identification message serves to identify a single responsible person to resolve an overdue aircraft situation and ensure that all persons initially notified of the alert condition can trust that the matter is being resolved in a responsible manner. The location of an overdue aircraft can thus be coordinating among several responsible persons in an effective and efficient manner.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
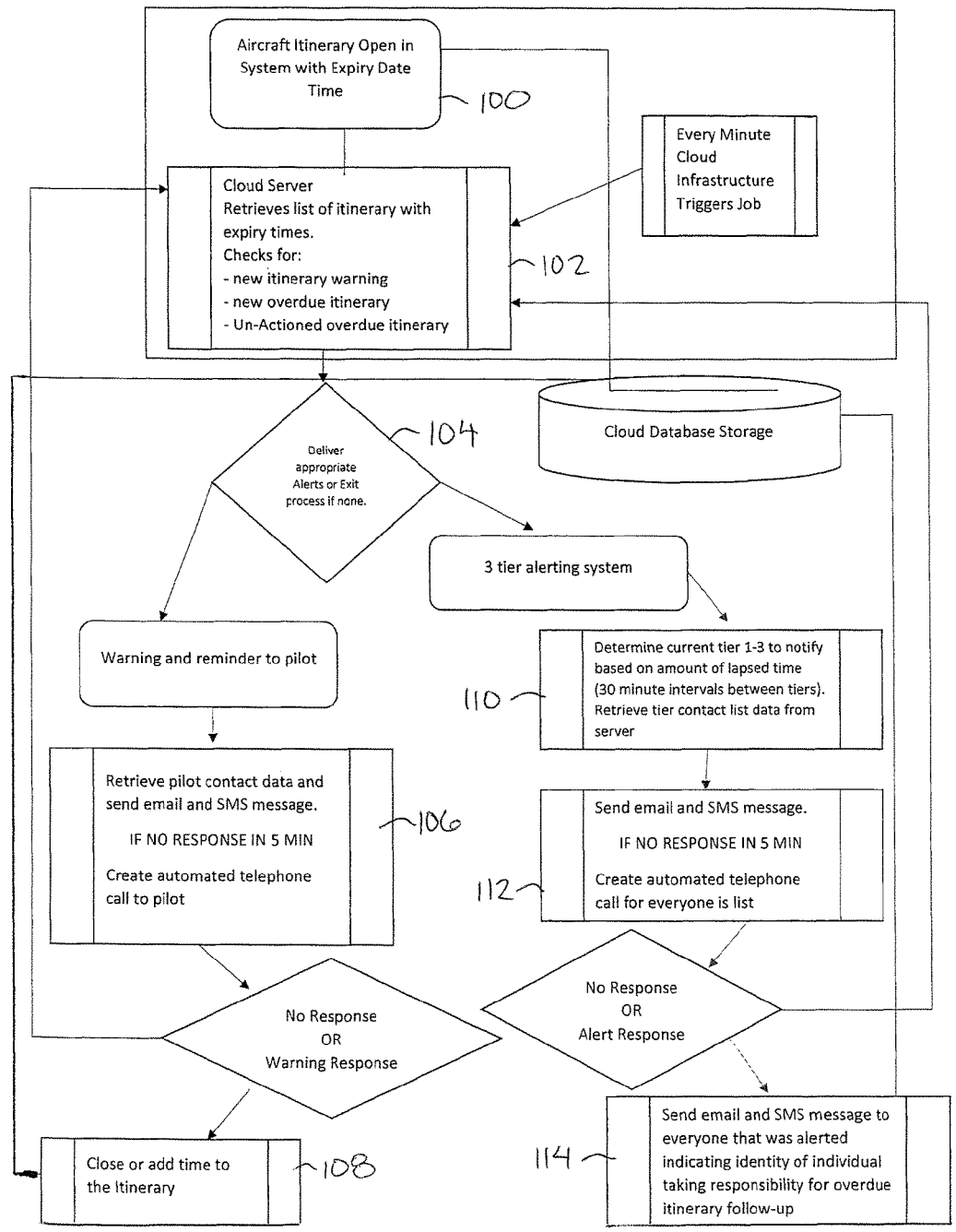
FIG. 1 is a flow chart representing the operation of the flight itinerary alerting system.
Figure 2:
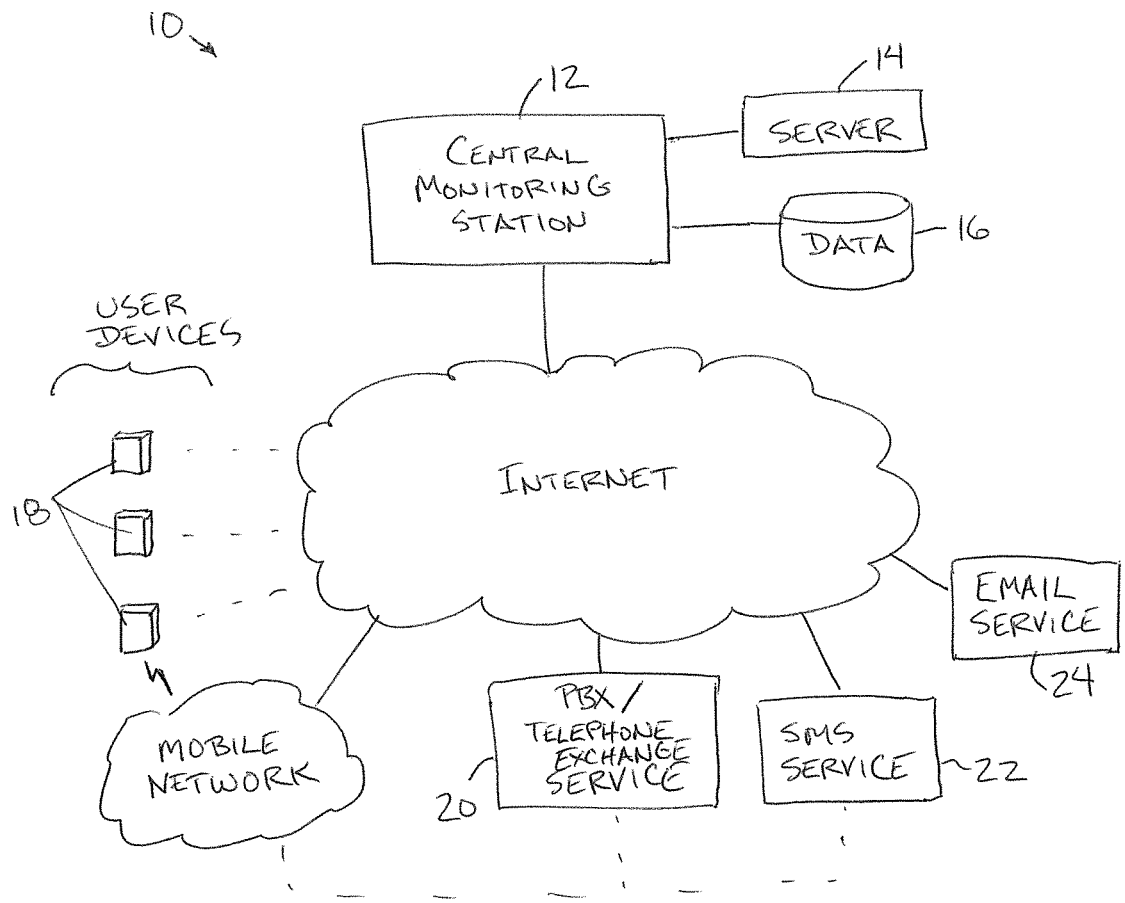
FIG. 2 is a schematic representation of the flight itinerary alerting system.
Figure 3:
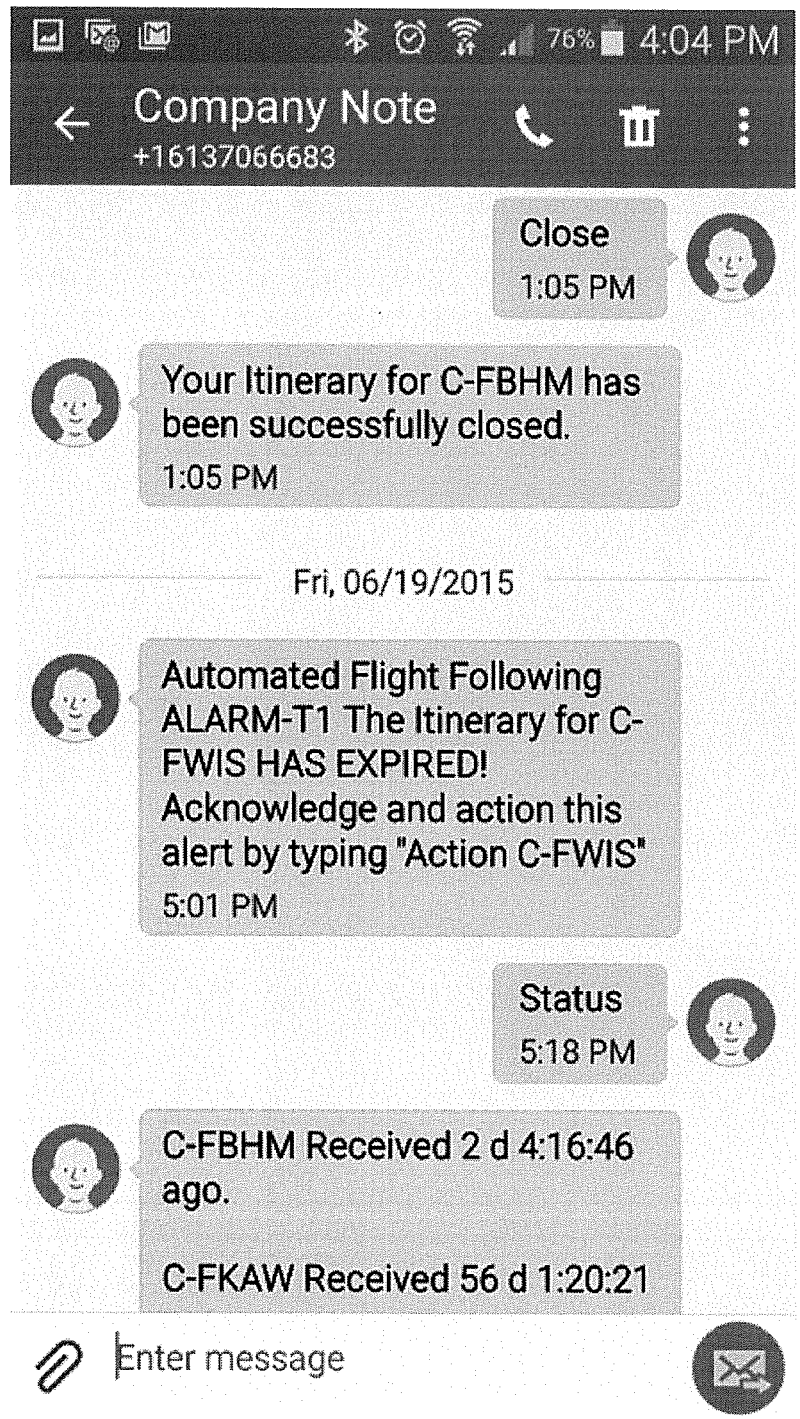
FIG. 3 is an exemplary screen shot of an SMS communication between the flight itinerary alerting system and a personal computer device of the pilot.

Referring to the accompanying Figures, there is illustrated a flight itinerary alerting system generally indicated by reference numeral 10. The system 10 serves to monitor if aircraft itineraries remain open after the expected arrival time, and to alert responsible persons as to whether possible action should be taken as described in the following.

The system 10 includes a central monitoring station 12 comprised of one or more computer servers 14 situated at one or more locations to collectively provide the functions described in the following. The system 10 includes a memory 16 locating databases of information thereon as well as storing programming thereon which is executable by a processor of the server.

The central monitoring station 12 includes an alert processing routine executable thereon for the purposes of communicating messages between the central station 12 and a plurality of users of the system including a pilot associated with each aircraft flight which serves as the primary contact person for the flight, one or more first tier contact persons, one or more second tier contact persons, one or more third tier contact persons, and a system operator.

The system communicates with a plurality of user computer devices 18 associated with respective ones of the contact persons. The computer devices may take the form of personal computers, tablets, smart phones, or any other suitable computing device capable of one or more forms of communication by email, short message service, or telephone network by connection to one or more of a wireless network, a wired connection to the Internet, a mobile telephone network, and the like.

The central monitoring station 12 includes a communication interface which includes a PBX or telephone exchange interface 20, a short message service interface 22, and an email interface 24. Each of the interfaces is provided by an Internet-based service provider independent from the other interfaces. The various interfaces allow various forms of communication to occur between the central monitoring station and the user devices.

The central monitoring station includes various notification data stored thereon including contact data associated with each of the contact persons. This includes pilot contact data associated with each aircraft flight relating to the email address and mobile phone number of the pilot as well as contact data for each tiered contact person including the first tier contact persons, the second tier contact persons and the third tier contact persons. The contact data of each tiered person also includes an email address as well as a mobile phone number for SMS messaging and telephone calls.

As each contact person is set up in the system, the contact information must be validated by the system using a validation routine executable by the central monitoring station. Each user can login to the system using a computer device capable of forming a connection to a web based interface, or an application based interface for example. Each contact uses their email address as a username which is subsequently recorded as contact data for that contact person. The user can then add a mobile phone number. The system sends a validation code by SMS message to the mobile phone number with instructions for the person to reply with a suitably formatted SMS code back to the communication interface of the system which then validates the mobile phone number for that contact user. This validation process occurs for both the tiered contact persons and the pilot acting as the primary contact person for a designated aircraft flight.

The alert processing routine actively monitors an aircraft flight subsequent to a pilot initially logging in to the central monitoring station, by web or application based interface, and opening an itinerary in the system. Each flight itinerary is stored on the system together with additional relevant information collectively stored as flight itinerary data including departure time of the flight, the expected duration of the flight, the expected arrival time of the flight, pilot contact data associated with a pilot of the flight, GPS tracker information, aircraft identification, a passenger manifest, a listing of dangerous goods being transported, a route plan, a fuel plan, etc. Opening of the itinerary is shown at step 100 in FIG. 1.

At periodic intervals, the alert processing routine executes the process as outlined in FIG. 1. More specifically, at each interval, the routine retrieves a list of itineraries with expiry times from the server and checks for new itinerary warnings, new overdue itinerary, and un-actioned overdue itineraries as shown at step 102. If a new monitored itinerary is found at determination step 104 to have reached the expected arrival time but the itinerary remains open, warning messages to the pilot are initiated at step 106 by retrieving pilot contact data and sending an email and SMS message as a first warning message to the pilot. If no response is received within five minutes, the system creates an automated telephone call to the pilot. For example, if the expected arrival time is 6 PM, then an email and SMS message are sent at 6 PM, followed by a phone call at 6:05 PM upon expiration of a warning duration following the expected arrival time.

Each alert message emailed to a contact person includes the following information: the alert status such as tier 1, tier 2 or tier 3; the identification of the aircraft; a satellite phone number for the aircraft if provided; the pilot name and contact information; the number of passengers; manifest information such as a passenger list, destinations, etc.; the expected arrival time; a GPS map with the last 10 known reported positions of the aircraft; the last receipt time of communication from the aircraft including aircraft coordinates, speed of the aircraft, heading, and altitude; and a link for the recipient to action upon the alert.

In the instance of a warning alert message to the pilot, the actions can include confirming that the itinerary should be closed by sending a deactivation message, or extending the expected arrival time by sending an extension message. The deactivation message or the extension message are typically sent by SMS communication using an identified code that the central monitoring station can interpret to perform either actions of closing the itinerary, or extending the expected arrival time of the itinerary. The message is only actioned upon by the central monitoring station if the message is received from a validated mobile phone number of the pilot. The action performed by the system is indicated at step 108.

If no reply is received from the warning message to the pilot, the alert processing routine executed on the central monitoring station will continue periodic interval checks to determine if further alert messages should be sent at a subsequent time.

Upon reaching the determination step 104, a first tier alert condition is determined if no deactivation message has yet been received by the central monitoring system from the primary contact person upon expiry of a first duration following the expected arrival time. In one example, the first duration may correspond to a period of approximately one hour from the expected arrival time.

Determination of the first tier alert condition results in sending an alert message to the computer devices of the first tier contact persons using the first tier contact data stored on the server. Similarly to the warning message to the pilot, the alert message in each instance comprises a first message at step 110 in the form of an email, and optionally an accompanying SMS message, followed by a second message at step 112 in the form of an automated phone call after a prescribed duration from the first message has expired. In the example of a 6 PM expected arrival time, the first tier alert condition is determined if no deactivation message has been received by the central monitoring system from the primary contact person upon expiry of a duration of one hour following the expected arrival time such that the first messages of the alert message are sent to the first tier contact persons at 7 PM, and the following automated phone call as a second message is sent at 7:05 PM.

In the instance of alert messages to the tiered contacts, in addition to the alert message information described above, each alert message further includes instructions to the contact persons to deactivate the alert system such that the person which first deactivates the alert system by sending a deactivation message to the system becomes the person responsible for the overdue aircraft. In the instance of an SMS alert message, instructions are provided to the contact persons as to the suitable code required to be texted back to the system to assume responsibility for the overdue aircraft. In an email alert, instructions are provided as a link for the contact person to follow. In response to receipt of a deactivation message from one of the tiered contact persons, the system sends a subsequent confirmation message at step 114 to all persons which have received the previous alert messages in which the confirmation message includes the identity of the origin of the deactivation message first received by the system. The person which assumes responsibility then follows the company policy sheets to determine how to respond to an overdue aircraft.

A second tier alert condition is determined if no deactivation message has been received by the central monitoring system from the primary contact person or any of the first tier contact persons upon expiry of a second duration following the expected arrival time. Upon determination of the second tier alert condition, alert messages are then sent to the pilot contact data, the first tier contact data and the second tier contact data. The second duration may correspond to sending alert messages to the pilot, the first tier contact persons, and the second tier contact persons at 7:30 PM for a 6 PM expected arrival time according to the above noted example. Again the alert messages consist of a first message by email or SMS which initiates the alert message, followed by a second message in the form of an automated phone call after a subsequent prescribed duration, for example at 7:35 PM according to the above noted example.

The determination of the second tier alert condition occurs at step 104 with the subsequent alert messaging occurring at steps 110 and 112 as described above with regard to the first tier alert condition. The alert processing routine performs the determination and sends the alert messages to the respective user computer devices of the respective contact persons using the corresponding contact person data stored on the server, also as described above.

The alert processing routine is further arranged to determine a third tier alert condition at step 104 if no deactivation code has been received by the central monitoring system from the primary contact person, the first tier contact persons, or the second tier contact persons upon expiry of a third duration following the expected arrival time. In the example above, the third duration is approximately 30 minutes longer than the second duration such that the third tier alert condition would be determined at 8 PM. Upon determination of the third tier alert condition, the system sends alert messages to the computer devices of each contact person including the pilot, and all tiered contact persons of the system in the usual manner of a first message by email or SMS upon initial determination of the alert condition, at 8 PM according to the illustrated example, followed by a second message in the form of an automated phone call, at 8:05 PM according to the illustrated example.

If no reply has yet been received in the form of a deactivation message from any contact persons upon expiry of a final duration, for example 8:30 PM according to the illustrated embodiment, then the system initiates contact with a system operator. The system operator can then contact search and rescue or follow the emergency response plan according to policy sheets for a particular company similar to the actions of any contact person assuming responsibility for the overdue aircraft.

Figure 4:
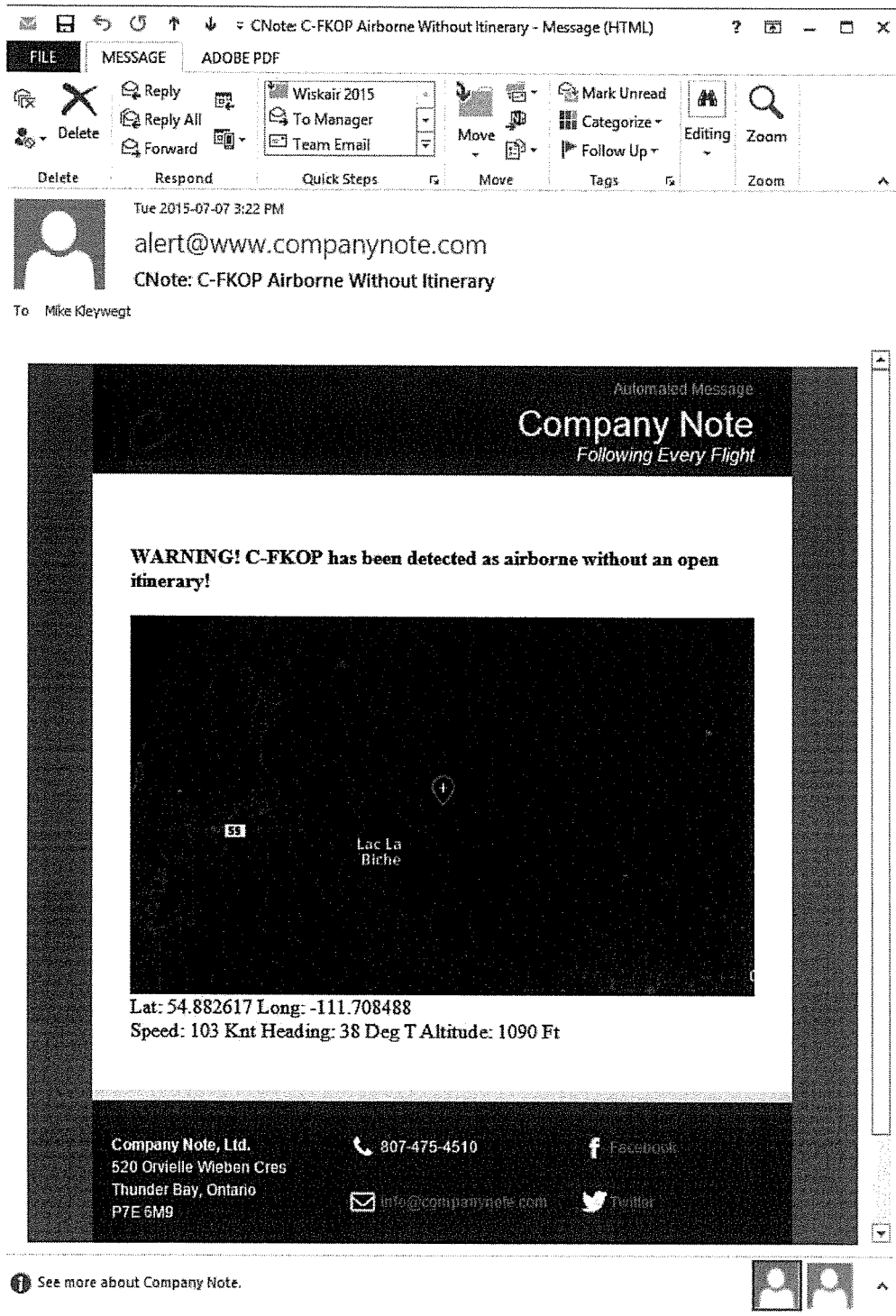
FIG. 4 is an exemplary screen shot of an alert message relating to unauthorized use of an aircraft.

The system 10 may operate together with an aircraft monitoring system which monitors GPS location of various designated aircraft to be monitored. In the event that a monitored aircraft has GPS information indicating that the aircraft is in flight however no open itinerary is found in the system relating to that identified aircraft, the system will send an alert message to designated contact persons stored on the system indicating unauthorized use of the aircraft. An exemplary email notification relating to unauthorized use of a monitored aircraft is shown in FIG. 4.

Figure 5:
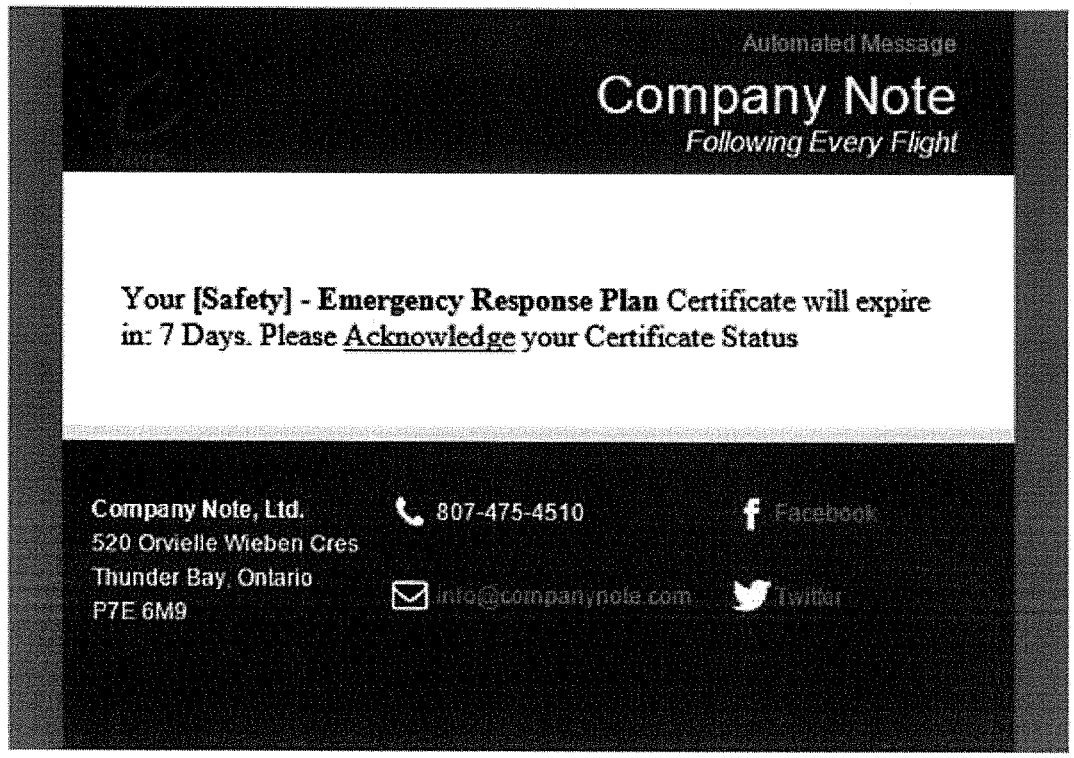
FIG. 5 is an exemplary screen shot of an alert message relating to expiry of an emergency response plan certificate.

The system is also capable of monitoring appropriate certificates are in place for all active aircraft and pilots to enable an appropriate message to be sent to management contact persons when a certificate is approaching an expiry date. This enables an appropriate response from management to ensure only qualified personnel are operating aircraft. An exemplary warning emailed to a designated contact person of the system is shown in FIG. 5.

Since various modifications can be made in the invention as herein above described, it is intended that all matter contained in the accompanying specification shall be interpreted as illustrative only and not in a limiting sense.

The invention claimed is:

1. A flight itinerary alerting system for monitoring a flight itinerary associated with an aircraft flight, the system comprising:
a central monitoring system comprising a computer server adapted to receive and store flight itinerary data which includes: i) an expected arrival time of the aircraft flight, ii) pilot contact data associated with a primary contact person corresponding to a pilot of the aircraft flight, iii) first tier contact data associated with at least one first tier contact person, and iv) second tier contact data associated with at least one second tier contact person;
at least one user computer device associated each of the contact persons respectively;
a communication interface enabling the central monitoring system to communicate with said plurality of user computer devices over a communications network so as to be adapted to: i) communicate a deactivation message from any one of the user computer devices to the central monitoring system, and ii) communicate alert messages from the central monitoring system to designated ones of the plurality of user computer devices as determined by the central monitoring system;
an alert processing routine executable on said central monitoring system so as to be adapted to:
i) determine a first tier alert condition if no deactivation message has been received by the central monitoring system from the primary contact person upon expiry of a first duration following the expected arrival time and send an alert message to said at least one user computer device of said at least one first tier contact person using the first tier contact data upon determination of the first tier alert condition; and ii) determine a second tier alert condition if no deactivation message has been received by the central monitoring system from the primary contact person or said at least one first tier contact person upon expiry of a second duration following the expected arrival time and send an alert message to said at least one user computer device of said at least one first tier contact person and said at least one second tier contact person using the first and second tier contact data upon determination of the second tier alert condition.

2. The system according to claim 1 wherein the communication interface includes a short message service interface adapted to receive the deactivation message in the form of a short message service message.

3. The system according to claim 1 wherein said at least one user computer device associated with the primary contact person comprises a mobile phone and wherein the system further comprises a validation routine executable on said central monitoring system so as to be adapted to only accept the deactivation message from the mobile phone of the primary contact person subsequent to an exchange of validation information with the mobile phone.

4. The system according to claim 3 wherein the communication interface includes a short message service interface adapted to receive the validation information in the form of a short message service message.

5. The system according to claim 1 wherein the central monitoring system is adapted to receive an extension message through the communication interface from said at least one user computer device of the primary contact person, and wherein the alert processing routine is adapted to extend the expected arrival time of the aircraft flight upon receipt of the extension message by the central monitoring system.

6. The system according to claim 5 wherein the communication interface includes a short message service interface adapted to receive the extension message in the form of a short message service message.

7. The system according to claim 1 wherein the communication interface includes at least two interfaces selected from the list consisting of a short message service interface, a telephone exchange interface, and an email server interface, and wherein each alert message comprises a first message transmitted through a first one of the communication interfaces and a second message transmitted through a second one of the communication interfaces after a prescribed duration following the first message.

8. The system according to claim 1 wherein each deactivation message includes identity information which identifies the contact person from which the deactivation message originated and wherein the alert processing routine is adapted to send an identification message, that includes the identity information, to the contact data of each contact person that previously received the alert message upon receipt of the deactivation message.

9. The system according to claim 1 wherein the flight itinerary data stored on the central monitoring system includes third tier contact data associated with at least one third tier contact person, and wherein the alert processing routine is adapted to determine a third tier alert condition if no deactivation code has been received by the central monitoring system from the primary contact person, said at least one first tier contact person, or said at least one second tier contact person upon expiry of a third duration following the expected arrival time and send an alert message to said at least one user computer device of each contact person upon determination of the third tier alert condition.

10. The system according to claim 1 wherein the communication interface includes at least two interfaces selected from the list consisting of a short message service interface, a telephone exchange interface, and an email server interface, and wherein the alert processing routine is adapted to send a warning message to the contact data of the primary contact person before expiry of said first duration, the warning message comprises a first message transmitted through a first one of the communication interfaces and a second message transmitted through a second one of the communication interfaces after a prescribed duration following the first message, but before the expiry of said first duration.

11. The system according to claim 1 wherein the alert processing routine is adapted to contact an operator of the central monitoring system if no deactivation message is received from any of the contact persons upon expiry of a final duration following the expected arrival time.

12. The system according to claim 1 including an aircraft monitoring system adapted to track a location of a plurality of aircraft, the alert processing routine being adapted to determine if an aircraft is in use based on the location being tracked, and send an alert message to at least the first tier contact data in response to determination of an aircraft being in use having no active flight itinerary data stored on the central monitoring system.

13. A flight itinerary alerting system for monitoring a flight itinerary associated with an aircraft flight, the system comprising:
 a central monitoring system comprising a computer server adapted to receive and store flight itinerary data which includes: i) an expected arrival time of the aircraft flight, ii) pilot contact data associated with a primary contact person corresponding to a pilot of the aircraft flight, and iii) other contact data associated with a plurality of other contact persons;
 at least one user computer device associated each of the contact persons respectively;
 a communication interface enabling the central monitoring system to communicate with said plurality of user computer devices over a communications network so as to be adapted to: i) communicate a deactivation message from any one of the user computer devices to the central monitoring system, and ii) communicate alert messages from the central monitoring system to designated ones of the plurality of user computer devices as determined by the central monitoring system, wherein each deactivation message includes identity information which identifies the contact person from which the deactivation message originated;
 an alert processing routine executable on said central monitoring system so as to be adapted to:
  i) determine a first tier alert condition if no deactivation message has been received by the central monitoring system from the primary contact person upon expiry of a first duration following the expected arrival time and send an alert message to said at least one user computer device of said at least one first tier contact person using the first tier contact data upon determination of the first tier alert condition; and
  ii) send an identification message, that includes said identity information, to the contact data of each contact person that previously received the alert message upon receipt of the deactivation message.

* * * * *